(12) United States Patent
Xia et al.

(10) Patent No.: US 9,237,437 B2
(45) Date of Patent: Jan. 12, 2016

(54) METHOD AND APPARATUS FOR HOME AGENT REDIRECT

(75) Inventors: Yangsong Xia, Nanjing (CN); Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 908 days.

(21) Appl. No.: 12/476,052

(22) Filed: Jun. 1, 2009

(65) Prior Publication Data

US 2010/0020747 A1 Jan. 28, 2010

Related U.S. Application Data

(60) Provisional application No. 61/082,790, filed on Jul. 22, 2008.

(51) Int. Cl.
| | | |
|---|---|---|
| H04W 8/06 | (2009.01) | |
| H04W 8/12 | (2009.01) | |
| H04W 80/04 | (2009.01) | |

(52) U.S. Cl.
CPC .............. *H04W 8/065* (2013.01); *H04W 8/12* (2013.01); *H04W 80/04* (2013.01)

(58) Field of Classification Search
None
See application file for complete search history.

(56) References Cited

U.S. PATENT DOCUMENTS

| | | | | |
|---|---|---|---|---|
| 6,907,016 B2* | 6/2005 | Madour et al. | ................ | 370/331 |
| 7,149,225 B2* | 12/2006 | Thubert et al. | ................ | 370/401 |
| 7,343,158 B2* | 3/2008 | Mizell et al. | ............... | 455/435.1 |
| 7,366,145 B2* | 4/2008 | Flinck | .......................... | 370/338 |
| 7,489,667 B2* | 2/2009 | Faccin et al. | .................. | 370/338 |
| 7,564,824 B2* | 7/2009 | O'Neill | ......................... | 370/338 |
| 7,593,377 B2* | 9/2009 | Thubert et al. | ................ | 370/338 |
| 7,886,075 B2* | 2/2011 | Molteni et al. | ................ | 709/238 |
| 7,940,779 B2* | 5/2011 | Giaretta et al. | ............... | 370/400 |
| 8,140,073 B2* | 3/2012 | Williams et al. | ............. | 455/436 |
| 8,228,935 B2* | 7/2012 | Tsirtsis (Georgios) et al. | ............................. | 370/431 |
| 2002/0067704 A1 | 6/2002 | Ton | | |
| 2003/0073452 A1* | 4/2003 | Omae et al. | .................. | 455/466 |
| 2004/0148364 A1* | 7/2004 | Kim et al. | ..................... | 709/217 |
| 2004/0176095 A1* | 9/2004 | Yamada et al. | ............... | 455/445 |

(Continued)

FOREIGN PATENT DOCUMENTS

| | | |
|---|---|---|
| CN | 1697548 A | 11/2005 |
| CN | 1870636 A | 11/2006 |

(Continued)

OTHER PUBLICATIONS

Arkko, J., et al., "Using IPsec to Protect Mobile IPv6 Signaling Between Mobile Nodes and Home Agents," Newtork Working Group, Standard Track, Jun. 2004, pp. 1-40, The Internet Society.

(Continued)

*Primary Examiner* — Hassan Kizou
*Assistant Examiner* — Roberta A Shand
(74) *Attorney, Agent, or Firm* — Slater & Matsil, LLP

(57) ABSTRACT

A method and apparatus for home agent redirect is provided. A method for redirecting a device from a first home agent to a second home agent includes sending a first message to the first home agent, receiving a second message from the first home agent, and sending a third message to the second home agent. The first message includes a binding update, and the second message includes a binding acknowledgement and a redirect indication that the device is being redirected to the second home agent. The third message includes a binding update, and an address of the first home agent.

20 Claims, 6 Drawing Sheets

(56) References Cited

U.S. PATENT DOCUMENTS

| | | | |
|---|---|---|---|
| 2004/0196797 A1* | 10/2004 | Lee et al. | 370/313 |
| 2005/0015492 A1 | 1/2005 | Kumbalimutt et al. | |
| 2005/0119001 A1* | 6/2005 | Watanabe | 455/436 |
| 2005/0163134 A1* | 7/2005 | Cheon | 370/401 |
| 2005/0207382 A1* | 9/2005 | Hirashima et al. | 370/338 |
| 2009/0052425 A1* | 2/2009 | Aso et al. | 370/338 |
| 2009/0080387 A1* | 3/2009 | Dell'Uomo et al. | 370/338 |
| 2009/0116452 A1* | 5/2009 | Guan | 370/331 |
| 2009/0262685 A1* | 10/2009 | Schuringa et al. | 370/328 |
| 2010/0020747 A1 | 1/2010 | Xia et al. | |
| 2010/0284331 A1* | 11/2010 | Weniger et al. | 370/328 |
| 2010/0296481 A1* | 11/2010 | Weniger et al. | 370/331 |
| 2010/0316018 A1* | 12/2010 | Turanyi et al. | 370/331 |
| 2011/0164498 A1* | 7/2011 | Giaretta et al. | 370/232 |
| 2014/0129610 A1 | 5/2014 | Zhang | |

FOREIGN PATENT DOCUMENTS

| | | |
|---|---|---|
| CN | 102106123 B | 4/2015 |
| EP | 1912400 A1 | 4/2008 |
| JP | 2005286478 A | 10/2005 |
| WO | WO 2008/078632 A1 | 7/2008 |

OTHER PUBLICATIONS

Johnson, D., et al., "Mobility Support in IPv6," Network Working Group, Standard Track, Jun. 2004, pp. 1-165, The Internet Society.

Patel, A., et al., "Authentication Protocol for Mobile IPv6," Network Working Group, Information, Jan. 2006, pp. 1-19, The Internet Society.

Devarapalli, V., et al., "MObile IPv5 Operation with IKEv2 and the Revised IPsec Architecture," Network Working Group, Standards Track, Apr. 2007, pp. 1-26, The IEFT Trust.

Gundavelli, S., et al., "Proxy Mobile IPv6" NETLMM WG Internet-Draft, Apr. 8, 2007, pp. 1-45, The IEFT Trust.

Giaretta, G., et al., "Mobile IPv6 Bootstrapping in Split Scenario," Network Working Group, Standards Track, Oct. 2007, pp. 1-28, The IEFT Trust.

Haley, B., et al., "Mobility Header Home Agent Switch Message," Network Working Group, Standards Track, Jan. 2008, pp. 1-13, The IEFT Trust.

Devarapalli, V., et al., "Re-direct Mechanism for IKEv2," Network Working Group, May 15, 2008, pp. 1-11, The IEFT Trust.

Chinese Office Action and partial translation received in Chinese Patent Application No. 200980121262.0, mailed Feb. 23, 2012, 14 pages.

Devarapalli, V., et al., "Re-direct Mechanism for IKEv2; draft-devarapalli-ipsec-ikev2-redirect-02.txt," Network Working Group, Internet-Draft, Jul. 14, 2008, 12 pages.

European Office Action received in European Patent Application No. 09799969.2-1249, mailed May 10, 2012, 5 pages.

European Search Report received in European Patent Application No. 09799969.2-1249, mailed Jun. 1, 2011, 10 pages.

International Search Report and Written Opinion of the International Searching Authority received in Patent Cooperation Treaty Application No. PCT/CN2009/072713, mailed Sep. 24, 2009, 10 pages.

Krishnan, S., et al., "Redirecting Proxy Binding Updates in PMIPv6; draft-krishnan-mext-ha-redirect-01,"Network Working Group, Internet-Draft, Feb. 25, 2008, 10 pages.

Sarikaya, B., et al., "PMIPv6 Route Optimization Protocol; draft-qin-mipshop-pmipro-01.txt," Network Working Group, Internet-Draft, Nov. 14, 2007, 24 pages.

"Communication pursuant to Article 94(3) EPC," Application No. 09 799 969.2, Applicant: Huawei Technologies Co., Ltd., Jun. 20, 2013, 4 pages.

"Second Chinese Office Action," Chinese Application No. 200980121262.0, mailing date: Dec. 4, 2012, 20 pages.

"Third Chinese Office Action," Application No. 200980121262.0, mailing date: Jun. 26, 2013, 9 pages.

\* cited by examiner

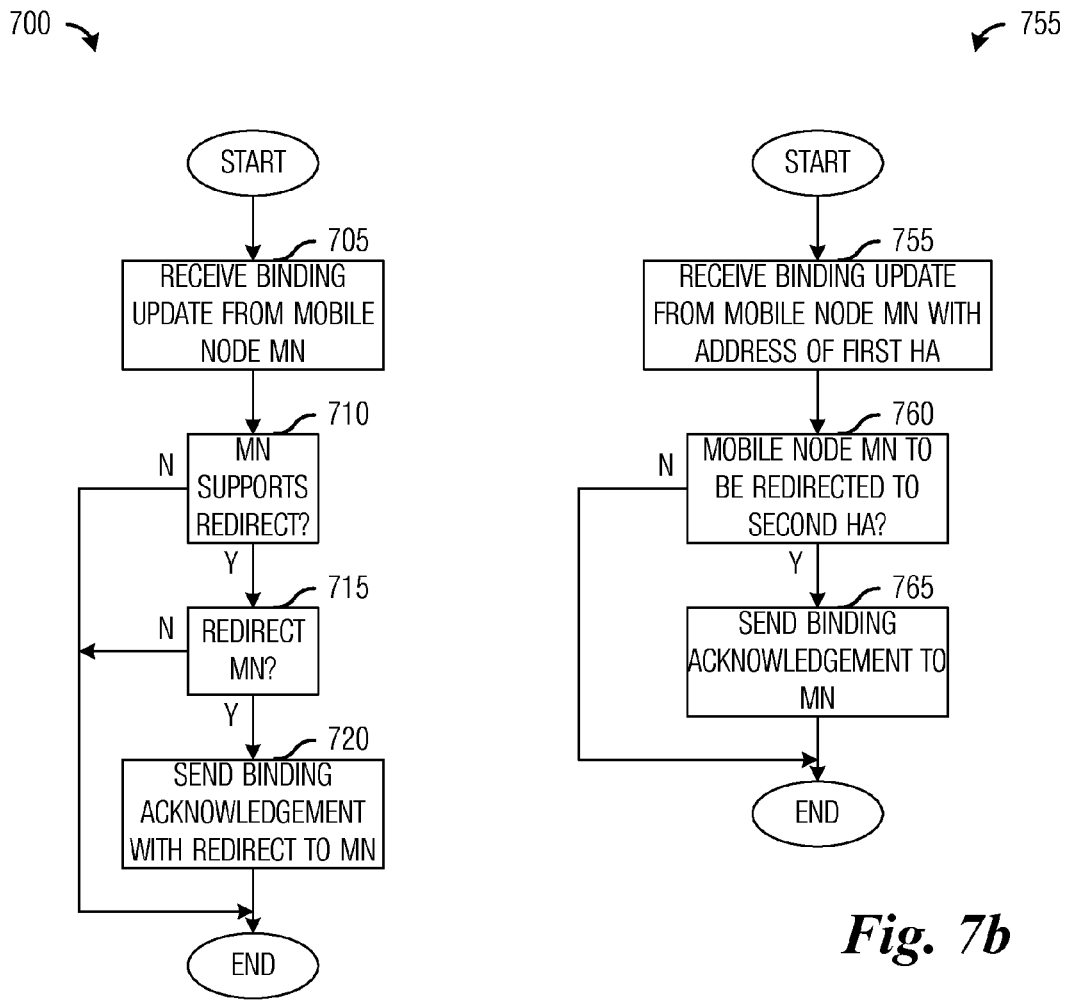
Fig. 7a
Fig. 7b
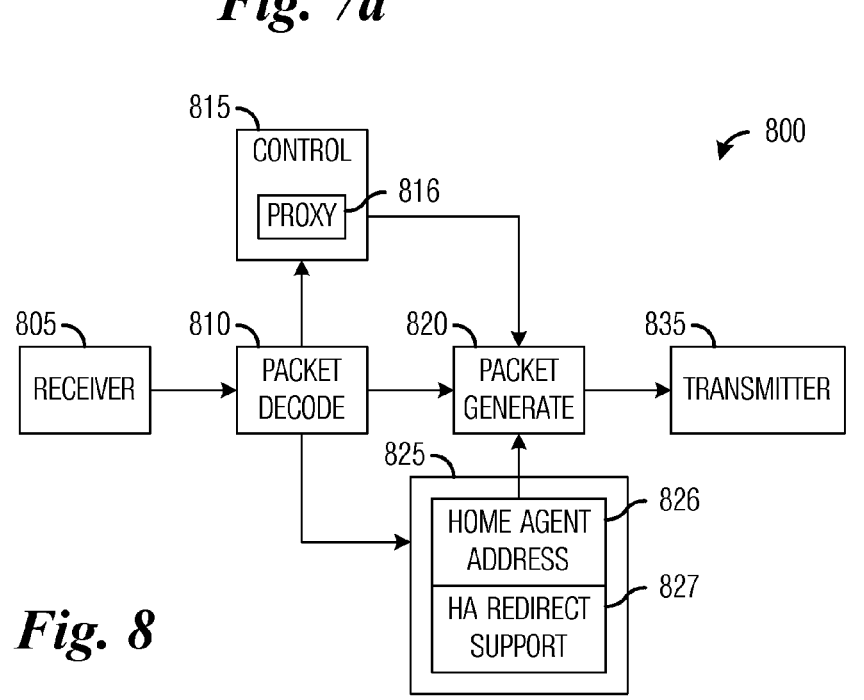
Fig. 8

METHOD AND APPARATUS FOR HOME AGENT REDIRECT

This application claims the benefit of U.S. Provisional Application No. 61/082,790, filed on Jul. 22, 2008, entitled "METHOD AND SYSTEM FOR HOME AGENT REDIRECT," which application is hereby incorporated herein by reference.

TECHNICAL FIELD

The present invention relates generally to communications, and more particularly to a method and apparatus for home agent redirect.

BACKGROUND

Mobile IPv6 (MIPv6) is an implementation of Internet Protocol version 6 (IPv6) that supports the exchange of data in a packet switched internetwork. MIPv6 allows an IPv6 node to be mobile, i.e., arbitrarily move about an IPv6 network while maintaining existing connections as well as reachability using an IPv6 address.

FIG. 1 illustrates an internetwork 100. Internetwork 100 includes a mobile node (MN) 105 that communicates with a host 110, for example. Communications between MN 105 and host 110 go through a home agent (HA) 115. All traffic to and from MN 105 should go through HA 115. MN 105 registers its current location, e.g., its IP address, with HA 115. However, prior to providing HA 115 with its own IP address, MN 105 may need to obtain the IP address of HA 115. Please refer to "Mobile IPv6 Bootstrapping in Split Scenario," Giaretta, G., Kempf, J., and V. Devarapalli, RFC 5026, October 2007, for a detailed discussion of the registration of a MN to a HA, which is incorporated herein by reference.

Generally, there may be multiple HAs that may serve as HA for a particular MN. A particular HA may be selected out of the multiple HAs based on factors such as proximity to either a MN or its host, HA response times, HA load, and so forth. Once a HA has been selected to be the HA of the MN, a sequence of messages may be exchanged to complete the registration process, with the exact sequence being dependent on the actual mechanism being used to perform the registration.

Typically, once the MN has registered with the HA, the MN may remain with the HA until it is powered down, leaves the internetwork, or so forth. However, it may be necessary for the HA of the MN to redirect the MN to a different HA. The HA may redirect the MN to the different HA due to factors such as overloading, load balancing, scheduled downtime, occurrence of unexpected fault or error, and so forth.

In "Mobility Header Home Agent Switch Message," Haley, B., Devarapalli, V., Deng, H., and J. Kempf, RFC 5142, January 2008, which is incorporated herein by reference, a mechanism called Home Agent Switch is proposed to allow for a HA to handoff some of its MNs to other HAs. A Home Agent Switch message may be used as a handoff notification between the HA and a MN. However, the Home Agent Switch mechanism may only be used after a binding cache has been created at the HA for the MN. The necessity of creating the binding cache may place additional burdens on the HA, which may already be overloaded or faulty.

SUMMARY OF THE INVENTION

These and other problems are generally solved or circumvented, and technical advantages are generally achieved, by embodiments of a method and apparatus for home agent redirect.

In accordance with an embodiment, a method for redirecting a device from a first home agent to a second home agent is provided. The method includes sending a first message to the first home agent, and receiving a second message from the first home agent. The first message includes a binding update that includes a redirect supported indication indicating that the device supports redirection, and the second message includes a binding acknowledgement and a redirect indication that the device is being redirected to the second home agent.

In accordance with another embodiment, an apparatus is provided. The apparatus includes a transmitter that sends a first message to a first home agent, and a receiver receives a second message from the first home agent. The first message comprises a binding update, and the binding update includes a redirect supported indication that indicates that the apparatus supports redirection. The second message includes a binding acknowledgement and a redirect indication that the apparatus is being redirected to a second home agent.

In accordance with another embodiment, a method for first home agent operation is provided. The method includes receiving a first message from a device, and sending a second message to the device in response to determining that the device is to be redirected to the first home agent. The first message includes an address of a second home agent from which the device is being redirected.

An advantage of an embodiment is that the redirection of a MN from a first HA to a second HA includes history information to help prevent a subsequent redirection of the MN back to the first HA. This may help to prevent undesired ping-ponging of the MN between HAs, which may negatively impact the performance of the MN, the first HA, and the second HA, as well as other communications devices due to increased network message traffic.

A further advantage of an embodiment is that the redirection of a MN from a first HA to a second HA may also occur even if a proxy is being used in place of the MN.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 7a is a flow diagram of home agent operations in a home agent redirect;

FIG. 7b is a flow diagram of target home agent operations in a home agent redirect; and FIG. 8 is a diagram of a high level view of an electronics device.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a mobile node communicating through a network using mobile IPv6 (MIPv6).

Figure 1:
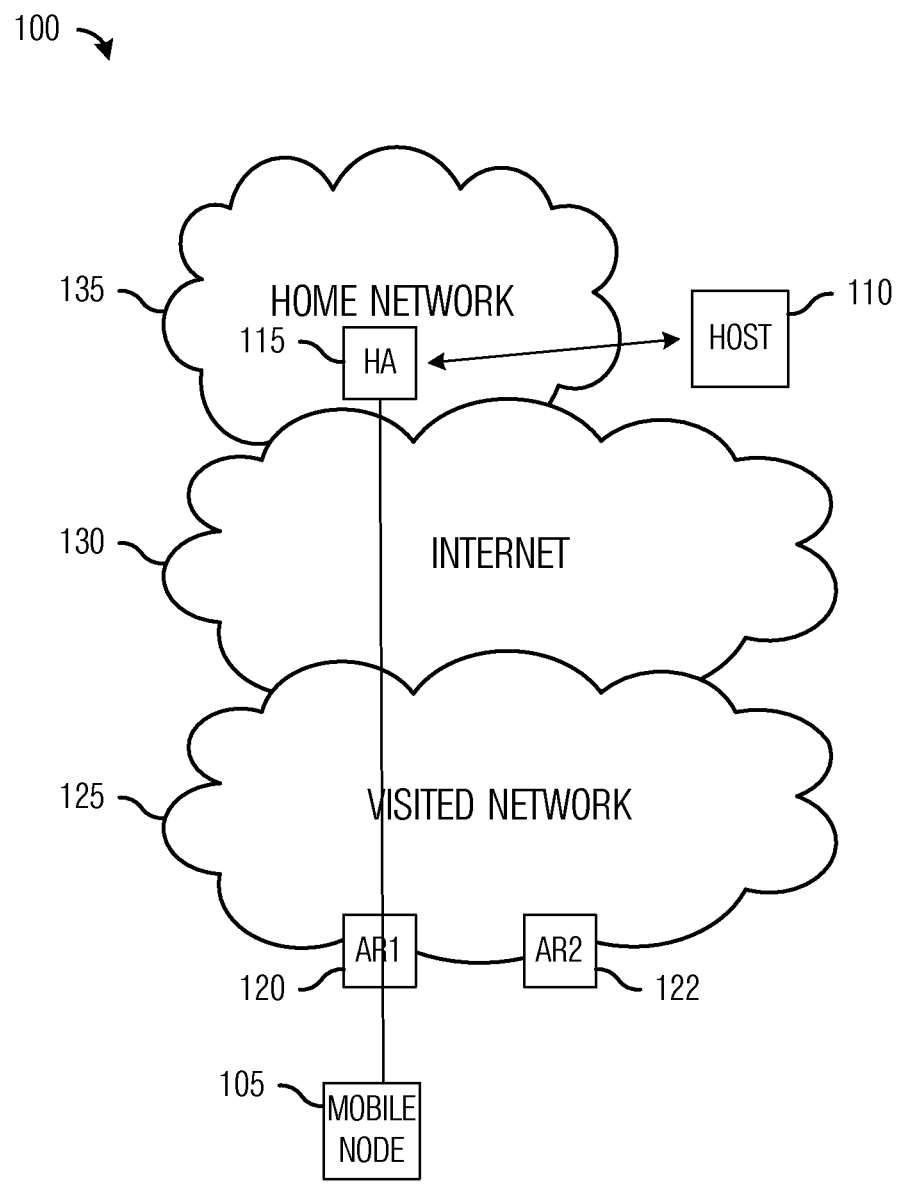
FIG. 1 is a diagram of an internetwork.
Figure 2A:
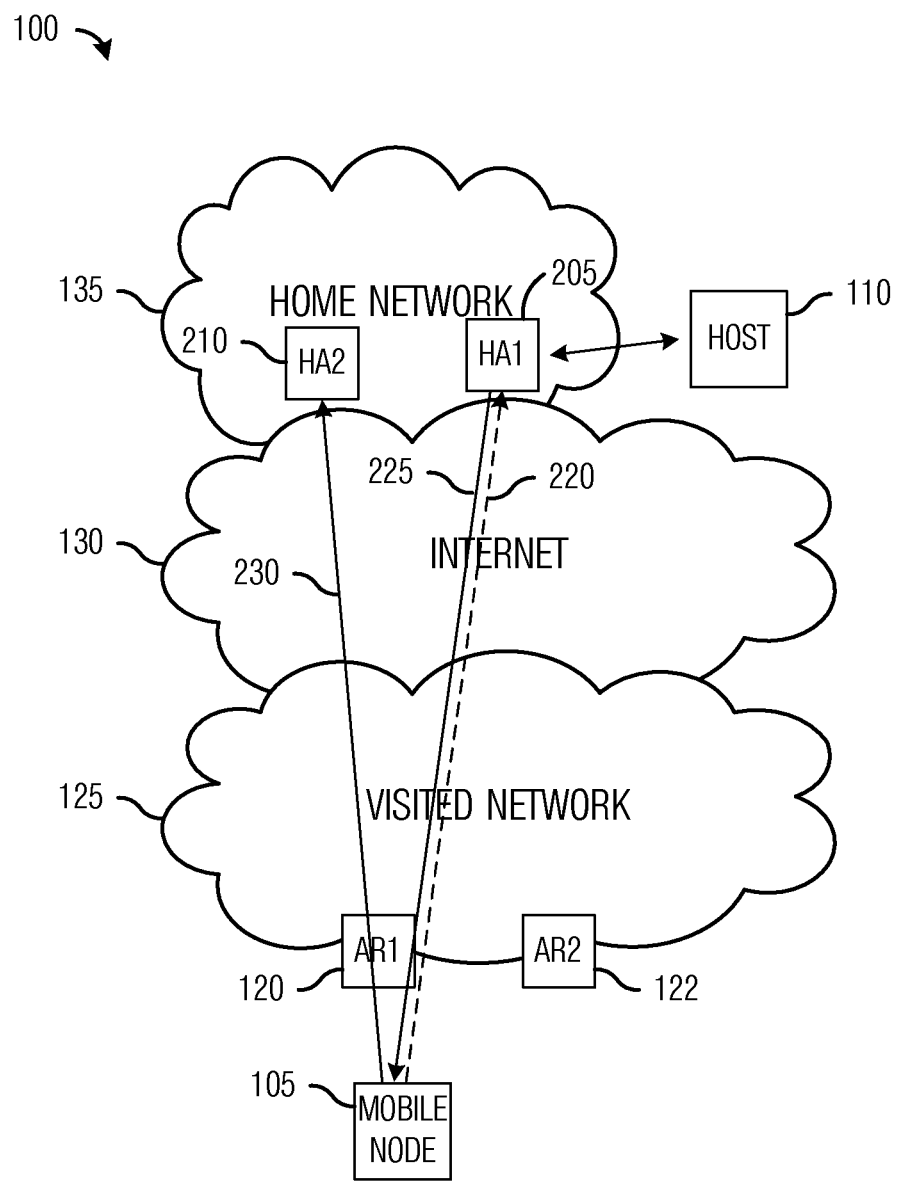
FIG. 2a is a diagram of a home agent redirect, wherein the home agent redirect takes place with a mobile node.

FIG. 2a illustrates a HA redirect, wherein the HA redirect takes place directly with a MN. As shown in FIG. 2a, a HA redirect results in the HA of MN 105 changing from HA1 205 to HA2 210. The HA redirect may be a three step process, with a first step being a transmission of a binding update (BU) from MN 105 to HA1 205 (shown as dashed line 220), a second step being a transmission of a binding acknowledgement (BA) with a REDIRECT option from HA1 205 to MN 105 (shown as solid line 225), and a third step being a transmission of a BU from MN 105 to HA2 210 (shown as solid line 230).

Figure 2B:
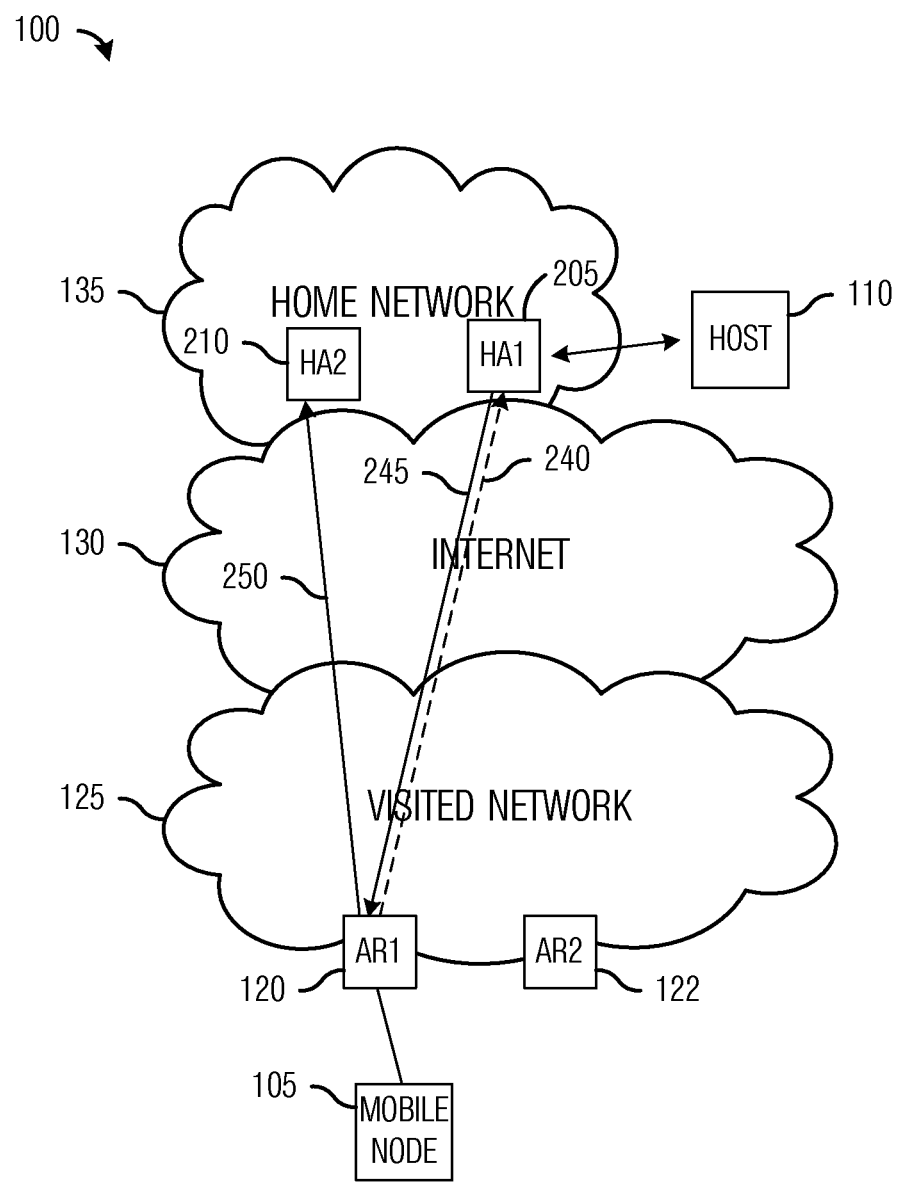
FIG. 2b is a diagram of a home agent redirect, wherein the home agent redirect takes place with a proxy of a mobile node.

FIG. 2b illustrates a HA redirect, wherein the HA redirect takes place with a proxy of a MN. In MIPv6 proxy operation (also referred to as proxy MIPv6 or PMIPv6), AR1 120 serves as a proxy for MN 105, and may be referred to as a mobile access gateway. HA1 205, serving as HA for MN 105 may be referred to as local mobility anchor. As shown in FIG. 2b, a HA redirect results in the HA of MN 105 changing from HA1 205 to HA2 210. Since AR1 120 is serving as proxy for MN 105, AR1 120 takes the place of MN 105 in the HA redirect. The HA redirect may be a three step process, with a first step being a transmission of a proxy binding update (PBU) from AR1 120 to HA1 205 (shown as dashed line 240), a second step being a transmission of a proxy binding acknowledgement (PBA) containing a REDIRECT option from HA1 205 to AR1 120 (shown as solid line 245), and a third step being a transmission of a PBU from AR1 120 to HA2 210 (shown as solid line 250).

Different HA redirection may differ depending on the use of Internet Protocol Security (IPsec) or the lack of IPsec (non-IPsec):

When IPsec is used, HA and MN are required to have IPsec security associations that are established and maintained by Internet Key Exchange (IKE), see "Mobility Support in IPv6," Johnson, D., Perkins, C., and J. Arkko, RFC 3775, June 2004, which is incorporated herein by reference. Operation with IKE version 1 (IKEv1) is described in "Using IPsec to Protect Mobile IPv6 Signaling Between Mobile Nodes and Home Agents," Arkko, J., Devarapalli, V., and F. Dupont, RFC 3776, June 2004, and security association maintenance with IKE version 2 (IKEv2) is described in "Mobile IPv6 Operation with IKEv2 and the Revised IPsec Architecture," Devarapalli, V. and F. Dupont, RFC 4877, April 2007, which are incorporated herein by reference. A HA redirect mechanism is proposed in "Re-direct Mechanism for IKEv2," Devarapalli, V., Weniger, K., and P. Eronen, draft-ietf-ipsecme-ikev2-redirect-09, May 2009.

When non-IPsec is used, an alternate method consisting of a MIPv6-specific mobility message authentication option added to MIPv6 signaling messages may be utilized, see "Authentication Protocol for Mobile IPv6," Patel, A., Leung, K., Khalil, M., Akhtar, H., and K. Chowdhury, RFC 4285, January 2006, which is incorporated herein by reference. Furthermore, additional MIPv6 options as disclosed below are added.

Figure 3A:
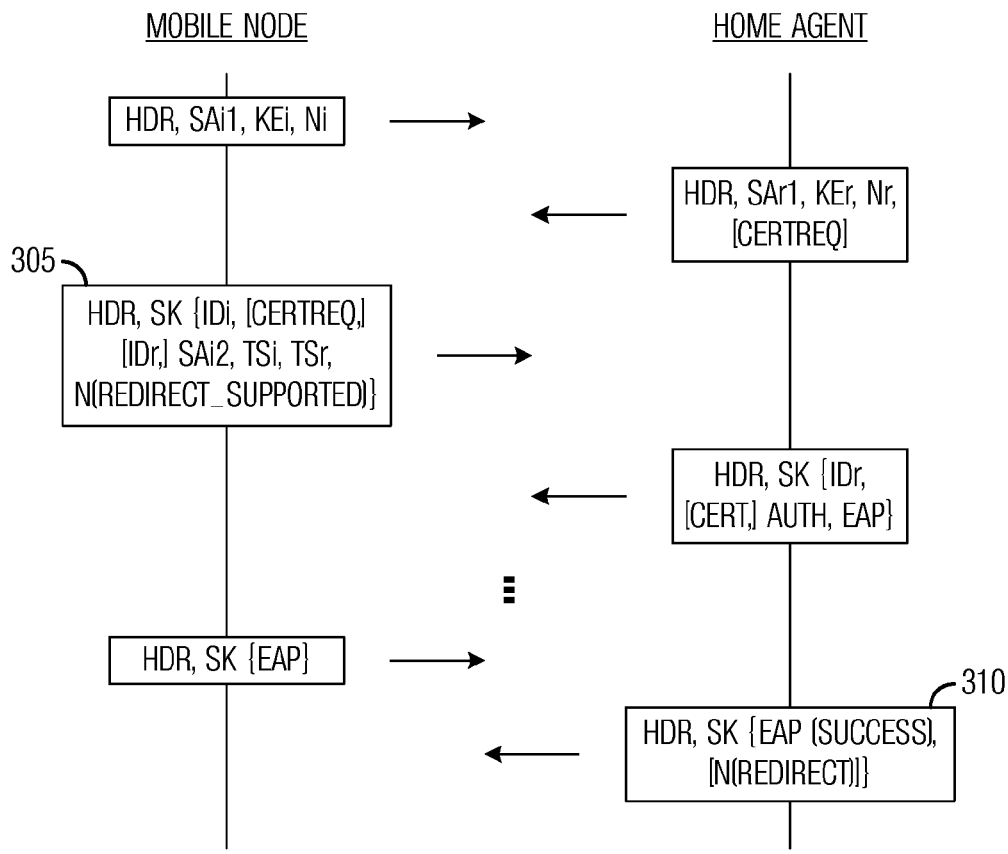
FIG. 3a is a diagram of a message exchange between a mobile node and a home agent in a home agent redirect, wherein the home agent redirect occurs using Internet Key Exchange version 2 messages.

FIG. 3a illustrates a message exchange between a MN and a HA in a HA redirect, wherein the HA redirect occurs with IKEv2. The message exchange includes messages that are typically part of an authentication exchange between the MN and the HA. However, the message exchange includes a transmission from the MN to the HA that includes an indication to the HA that the MN supports HA redirection (transmission 305). The indication that the MN supports HA redirection may be conveyed in a REDIRECT_SUPPORTED option and may be included in a binding update.

The REDIRECT_SUPPORTED option has the following form:

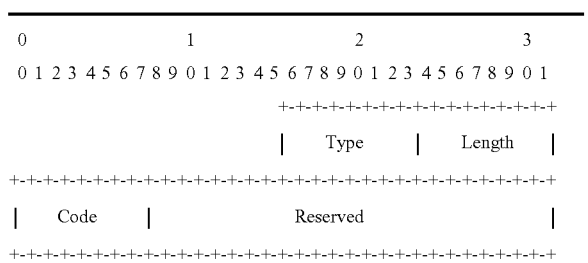

Type
TBD. REDIRECT_SUPPORTED, REDIRECT, and REDIRECTED_FROM share the same type value.
Length
representing the length in octets of the mobility option, not including the Type and Length fields
Code
1 REDIRECT_SUPPORTED
2 REDIRECT
3 REDIRECTED_FROM Returning now to FIG. 3a, the message exchange also includes a transmission from the HA to the MN that initiates a HA redirect by way of a redirect option (transmission 310). Transmission 310 may include an indication of a HA redirect as well as an address of a target HA (the target of the HA redirect), both of which may be conveyed in a REDIRECT option.

The REDIRECT option has the following form:

```
 0                   1                   2                   3
 0 1 2 3 4 5 6 7 8 9 0 1 2 3 4 5 6 7 8 9 0 1 2 3 4 5 6 7 8 9 0 1
                +-+-+-+-+-+-+-+-+-+-+-+-+-+-+-+-+
                |     Type      |    Length     |
+-+-+-+-+-+-+-+-+-+-+-+-+-+-+-+-+-+-+-+-+-+-+-+-+-+-+-+-+-+-+-+-+
|    Code       | Target HA Num | T |        Reserved           |
+-+-+-+-+-+-+-+-+-+-+-+-+-+-+-+-+-+-+-+-+-+-+-+-+-+-+-+-+-+-+-+-+
|                                                               |
~              Target Home Agent addresses                      ~
|                                                               |
+-+-+-+-+-+-+-+-+-+-+-+-+-+-+-+-+-+-+-+-+-+-+-+-+-+-+-+-+-+-+-+-+
```

Figure 3B:
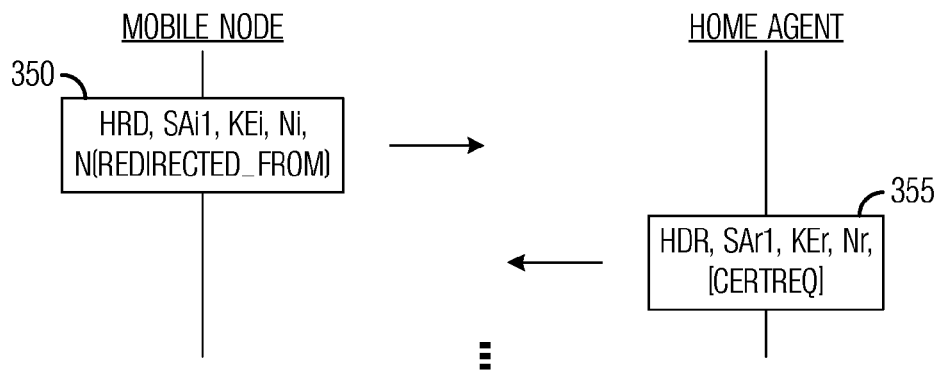
FIG. 3b is a diagram of a message exchange between a mobile node and a target home agent in a home agent redirect, wherein the home agent redirect occurs using Internet Key Exchange version 2 messages.

Type
TBD. REDIRECT_SUPPORTED, REDIRECT, and REDIRECTED_FROM share the same type value.
Length
representing the length in octets of the mobility option, not including the Type and Length fields
Code
1 REDIRECT_SUPPORTED
2 REDIRECT
3 REDIRECTED_FROM
Target HA num
Number of target home agent addresses in the following list
T
The type of address. It has the following meaning:
01 The home agent's address is IPv4
11 The home agent's address is IPv6
Target Home Agent addresses
list of IP address FIG. 3b illustrates a message exchange between a MN and a target HA in a HA redirect, wherein the HA redirect occurs with IKEv2. When the MN receives transmission 310 with the REDIRECT option, the MN may initiate a new IKE_SA_INIT exchange with the target HA. The new IKE_SA_INIT exchange includes a message that contains an address of the HA that redirected the MN to the target HA, in the form of a REDIRECTED_FROM option (transmission 350). The target HA may respond with an acknowledgement (transmission 355).

The REDIRECT_FROM option has the following form:

```
 0                   1                   2                   3
 0 1 2 3 4 5 6 7 8 9 0 1 2 3 4 5 6 7 8 9 0 1 2 3 4 5 6 7 8 9 0 1
                +-+-+-+-+-+-+-+-+-+-+-+-+-+-+-+-+
                |     Type      |    Length     |
+-+-+-+-+-+-+-+-+-+-+-+-+-+-+-+-+-+-+-+-+-+-+-+-+-+-+-+-+-+-+-+-+
|    Code       | T |              Reserved                     |
+-+-+-+-+-+-+-+-+-+-+-+-+-+-+-+-+-+-+-+-+-+-+-+-+-+-+-+-+-+-+-+-+
|                                                               |
~              Original Home Agent address                      ~
|                                                               |
+-+-+-+-+-+-+-+-+-+-+-+-+-+-+-+-+-+-+-+-+-+-+-+-+-+-+-+-+-+-+-+-+
```

Type
TBD. REDIRECT_SUPPORTED, REDIRECT, and REDIRECTED_FROM share the same type value.
Length
representing the length in octets of the mobility option, not including the Type and Length fields
Code
1 REDIRECT_SUPPORTED
2 REDIRECT
3 REDIRECTED_FROM
T
The type of address. It has the following meaning:
01 The home agent's address is IPv4
11 The home agent's address is IPv6
Original Home Agent address
An IP address of original home agent The presence of the address of the HA initiating the HA redirect in the REDIRECT option may be used to help prevent a situation wherein the MN is continually redirected between HAs. For example, HA1 may redirect a MN to HA2, which may redirect the MN back to HA1. The address of the redirect initiator may prevent the redirect from HA2 back to HA1.

In an alternate embodiment, rather than sending only the address of the HA initiating the HA redirect, the REDIRECT option may include or the MN may store a list of addresses of HAs that it has been redirected from and to. The list of addresses may be used to break redirection loops as well as help in the selection of a target HA for redirection.

Figure 4:
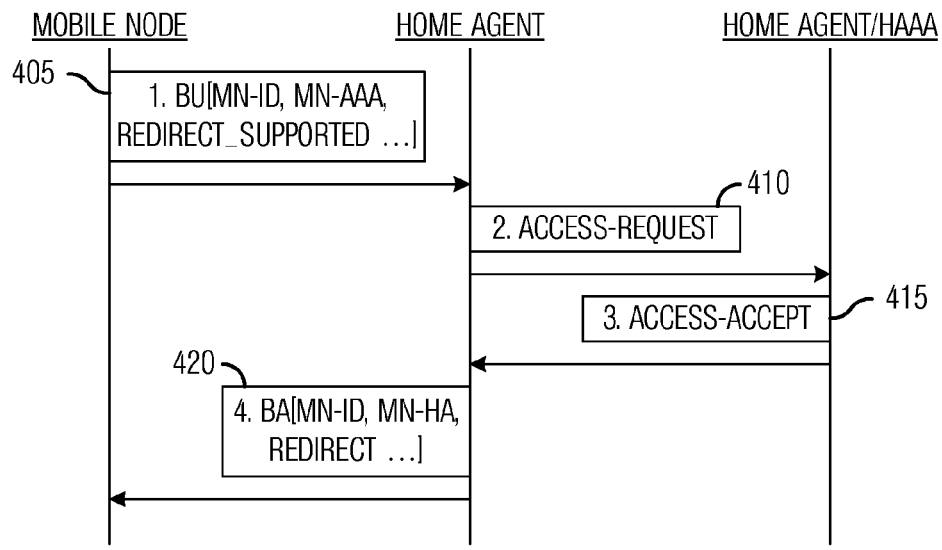
FIG. 4 is a diagram of a message exchange between a mobile node and a home agent in a home agent redirect, wherein the home agent redirect occurs using Mobile Internet Protocol version 6 authentication protocol messages.

FIG. 4 illustrates a message exchange between a MN and a HA in a HA redirect, wherein the HA redirect occurs with an authentication protocol for MIPv6. The message exchange begins with the MN sending a binding update (BU) to the HA (transmission 405). The BU (transmission 405) includes the REDIRECT_SUPPORTED option as discussed above to indicate to the HA that the MN supports HA redirects. The BU also includes a MN-AAA authentication mobility option, which may be used to authenticate the MN.

The HA may extract from the BU, an identifier of the MN (MN-ID), authenticator, and so forth. The HA may send an AAA Access Request message to a Home AAA server to authenticate the MN (transmission 410). The Home AAA server authenticates and authorizes the MN and sends back an AAA Access Accept message to the HA (transmission 415). The AAA Access Accept message may be an indicator that the authentication and authorization of the MN was successful. Furthermore, the Home AAA server also distributes a MN-HA key to the HA for subsequent MN-HA processing.

The HA may send a binding acknowledgement (BA) to the MN (transmission 420). The BA (transmission 420) includes the REDIRECT option as discussed above to initiate a HA redirect of the MN from the HA to a target HA, the address of which is included in the REDIRECT option.

When the MN receives the BA with the REDIRECT option, the MN may initiate a new BU/BA message exchange with the target HA (specified in the REDIRECT option). The MN includes the address of the HA that redirected the MN to the target HA.

Figure 5:
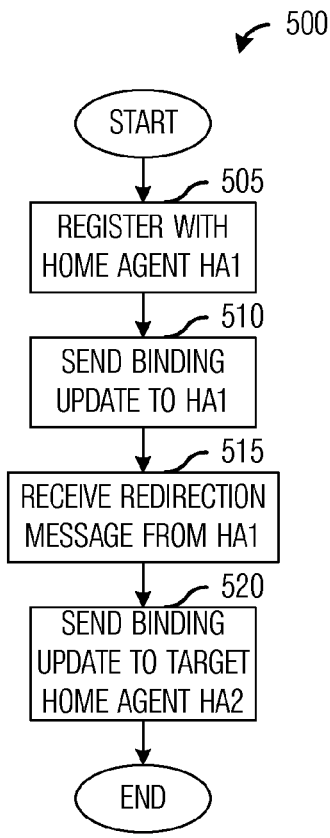
FIG. 5 is a flow diagram of mobile node operations in a home agent redirect.

FIG. 5 illustrates a flow diagram of MN operations 500 in a HA redirect. MN operations 500 may be indicative of operations taking place in a MN, such as MN 105, when it is redirected from a HA, such as HA1 205, to a target HA, such as HA2 210. MN operations 500 may occur at any time while the MN is in a normal operating mode and while the MN supports HA redirection. Actual message exchanges may depend on the use of IPsec or non-IPsec techniques. However, the underlying operations are consistent with both.

MN operations 500 may begin with the MN registering with the HA (block 505). After completing registration with the HA, MN may send a BU to the HA (block 510). The BU may include the REDIRECT_SUPPORTED option informing the HA that the MN supports HA redirection. If the MN does not include the REDIRECT_SUPPORTED option in the BU, then the MN may not be a candidate for HA redirection.

If the MN supports HA redirection and included the REDIRECT_SUPPORTED option in the BU, and if the HA wishes to redirect the MN, then the MN may receive a BA from the HA, wherein the BA includes a REDIRECT option (block 515). The HA may include in the REDIRECT option an address of a target HA, to whom it wishes to redirect the MN to.

The MN may send a BU to the target HA (block 520). The BU may include a REDIRECT_FROM option, which includes an address of the HA. When the target HA responds to the BU from the MN, the MN has successfully redirected from the HA to the target HA and MN operations 500 may terminate.

Figure 6:
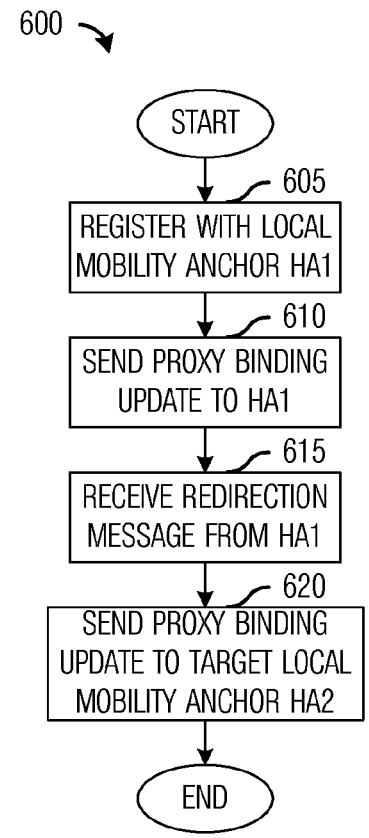
FIG. 6 is a flow diagram of proxy operations in a home agent redirect.

FIG. 6 illustrates a flow diagram of mobile access gateway (MAG) operations 600 in a HA redirect. MAG operations 500 may be indicative of operations taking place in a MAG, such as AR1 120, when it is redirected from a local mobility anchor (LMA), such as HA1 205, to a target LMA, such as HA2 210. MAG operations 500 may occur at any time while the MAG is in a normal operating mode and while the MAG supports HA redirection. Actual message exchanges may depend on the use of IPsec or non-IPsec techniques. However, the underlying operations are consistent with both.

MAG operations 600 may begin with the MAG registering with the LMA (block 605). After completing registration with the LMA, MAG may send a PBU to the LMA (block 610). The PBU may include an option (REDIRECT_SUPPORTED) informing the LMA that the MAG supports HA redirection. If the MAG does not include the REDIRECT_SUPPORTED option in the PBU, then the MAG may not be a candidate for HA redirection.

If the MAG supports HA redirection and included the REDIRECT_SUPPORTED option in the PBU, and if the LMA wishes to redirect the MAG, then the MAG may receive a PBA from the LMA, wherein the PBA includes a REDIRECT option (block 615). The LMA may include in the REDIRECT option an address of a target LMA, to whom it wishes to redirect the MAG to.

The MAG may send a PBU to the target LMA (block 620). The PBU may include a REDIRECT_FROM option, which includes an address of the LMA. When the target LMA responds to the PBU from the MAG with a PBA, the MAG has successfully redirected from the LMA to the target LMA and MAG operations 600 may terminate.

FIG. 7a illustrates a flow diagram of HA operations 700 in a HA redirect. HA operations 700 may be indicative of operations occurring at a HA, such as HA1 205, which may for reasons such as being overloaded, scheduled downtime, detected fault, and so forth, wishes to redirect at least one MN to a target HA, such as HA2 210. HA operations 700 may occur at any time while the HA is in a normal operating mode and is a registered HA for at least one MN that supports HA redirection. Actual message exchanges may depend on the use of IPsec or non-IPsec techniques. However, the underlying operations are consistent with both.

HA operations 700 may begin with the HA receiving a BU from the MN (block 705). The BU may include the REDIRECT_SUPPORTED option informing the HA that the MN supports HA redirection. If the MN does not include the REDIRECT_SUPPORTED option in the BU, then the MN may not be a candidate for HA redirection.

If the MN supports HA redirection (block 710) and if the HA needs to redirect the MN (block 715), then the HA may send a BA to the MN (block 720). The BA may include the REDIRECT option informing the MN to redirect to a target HA, whose address is included in the BA. HA operations 700 may then terminate.

Although the description of HA operations 700 focuses on a HA redirection with a MN, HA redirection may also occur with a proxy of a MN, for example, an access router. In PMIPv6, an HA is also known as a Local Mobility Anchor (LMA). When a LMA redirection occurs with a proxy (also referred to as a mobile access gateway), the message exchange is between the LMA and the mobile access gateway rather than the MN. Furthermore, a PBU replaces the BU and a PBA replaces the BA. For example, in block 705, instead of receiving a BU from the MN, the LMA receives a PBU from the mobile access gateway, and in block 720, instead of sending a BA to the MN, the LMA sends a PBA to the mobile access gateway.

FIG. 7b illustrates a flow diagram of HA operations 750 in a HA redirect, wherein the HA is a target HA. HA operations 750 may be indicative of operations at a target HA, such as HA2 210. HA operations 750 may occur at any time when the target HA is in normal operating mode.

HA operations 750 may begin with the target HA receiving a BU from a MN (block 755). The BU may include the REDIRECT_SUPPORTED option informing the target HA that the MN supports HA redirection. Furthermore, the BU may also include an address of a HA that is redirecting the MN to the target HA. The target HA may then determine if the MN is to be redirected to the target HA (block 760). If the MN is to be redirected to the target MN, then the target MN may send a BA to the MN (block 765). HA operations 750 may then terminate.

FIG. 8 illustrates a high-level view of a device 800. Device 800 includes a receiver 805 to receive transmissions. Receiver 805 may be wireless, wired, or both wireless and wired. Received transmissions may be decoded by a packet decode 810, which may partially decode a packet where contents of the packet may be processed. A control 815 may be used to control the packet reception and transmission in device 800, as well as any additional processing needed to perform packet processing, routing, and so forth. Control 815 may also be used to control the operation of device 800 in a HA redirect. Control 815 may also be used to provide proxy functionality, allowing device 800 to function as a mobile access gateway means for another device, such as a MN. For example, control 815 may include a proxy unit 816 that allows device 800 to operate as a mobile access gateway or proxy for a communications device coupled to device 800. Proxy unit 816 may include address translation functionality as well as the ability to control messages received from the communications device and to be transmitted to the communications device.

Also included is a packet generate 820 that may be used to generate packets for transmission. For example, packet generate 820 may be used to generate binding updates (BU) or binding acknowledgements (BA) for transmission. Packet generate 820 may include in the BU or BA information such as the REDIRECT_SUPPORTED option, target HA address, and so forth. Information to be included in the BU or BA may be stored in a memory 825, which may contain storage of information such as target home agent address, home agent address, REDIRECT_SUPPORTED option, and so forth. Output of packet generate 820 may then be provided to transmitter 835 for transmission. Transmitter 835 may be a wireless, wired, or both a wireless and wired transmitter.

Transmitter 835 may be used to send messages, i.e., function as a message sending means, such as a binding update to a HA that includes a REDIRECT_SUPPORTED option to indicate that device 800 supports redirection. The binding updates sent by transmitter 835 may also include an address of an HA that is the target of the redirection. Receiver 805 may be used to receive messages, i.e., function as a message receiving means, such as a binding acknowledgement from an HA that includes a REDIRECT option that may be used to indicate that device 800 is being redirected. The binding acknowledgements received by receiver 805 may also be used to complete a redirection when they sent by a target of the redirection.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for redirecting a device from a first home agent to a second home agent, the method comprising:
    registering, by a mobile node or mobile access gateway, with the first home agent;
    sending, by the mobile node or mobile access gateway, a first message to the first home agent, wherein the first message comprises a binding update, and wherein the binding update comprises a redirect supported indication that indicates that the mobile node or mobile access gateway supports redirection;
    receiving, by the mobile node or mobile access gateway, a second message from the first home agent, wherein the second message comprises a binding acknowledgement and a redirect indication that the mobile node or mobile access gateway is being redirected to the second home agent selected by the first home agent;
    sending, by the mobile node or mobile access gateway, a third message to the second home agent, wherein the third message comprises a binding update, and wherein the binding update comprises an address of the first home agent; and
    registering, by the mobile node or mobile access gateway, with the second home agent, wherein the first home agent and the second home agent are in a same home network of the mobile node, or of the mobile access gateway acting as a proxy for the mobile node.

2. The method of claim 1, wherein the redirect indication comprises support of a redirection operation of home agents.

3. The method of claim 1, wherein the second message comprises an Internet Protocol version 6 address of the second home agent.

4. The method of claim 1, wherein the second message comprises an Internet Protocol version 4 address of the second home agent.

5. The method of claim 1, wherein the address of the first home agent is an Internet Protocol version 4 address.

6. The method of claim 1, wherein the address of the first home agent is an Internet Protocol version 6 address.

7. The method of claim 1, wherein the device is a mobile access gateway.

8. The method of claim 7, wherein the first home agent comprises a local mobility anchor in proxy mobile IPv6.

9. The method of claim 1, further comprising, receiving a fourth message from the second home agent, wherein the fourth message comprises a binding acknowledgement.

10. The method of claim 1, wherein the binding update comprises a proxy binding update and the binding acknowledgement comprises a proxy binding acknowledgement.

11. A mobile node or mobile access gateway comprising:
    a transmitter of the mobile node or mobile access gateway configured to register the mobile node or mobile access gateway with a first home agent, and to send a first message to the first home agent, wherein the first message comprises a binding update, and wherein the binding update comprises a redirect supported indication that indicates that the mobile node or mobile access gateway supports redirection;
    a receiver of the mobile node or mobile access gateway configured to receive a second message from the first home agent, wherein the second message comprises a binding acknowledgement and a redirect indication that the mobile node or mobile access gateway is being redirected to a second home agent selected by the first home agent; and
    the transmitter of the mobile node or mobile access gateway further configured to send a third message to the second home agent, wherein the third message comprises a binding update, and wherein the binding update comprises an address of the first home agent, and configured to register the mobile node or mobile access gateway with the second home agent, wherein the first home agent and the second home agent are in a same home network of the mobile node, or of the mobile access gateway acting as a proxy for the mobile node.

12. The mobile node or mobile access gateway of claim 11, wherein the receiver is further configured to receive a fourth message from the second home agent, wherein the fourth message comprises a binding acknowledgement.

13. The mobile node or mobile access gateway of claim 11, wherein the mobile node or mobile access gateway is coupled to a communications node, the mobile node or mobile access gateway further comprising, a proxy unit coupled to the transmitter and the receiver, the proxy unit configured to send and receive messages to and from the communications node.

14. A method for first home agent operation, the method comprising:
    receiving, by the first home agent, a first message from a mobile node or mobile access gateway, wherein the first message comprises an address of a second home agent which selected the first home agent and at which the mobile node or mobile access gateway is registered, and from which the mobile node or mobile access gateway is being redirected;
    sending, by the first home agent, a second message to the mobile node or mobile access gateway in response to determining that the mobile node or mobile access gateway is to be redirected to the first home agent; and
    registering the mobile node or mobile access gateway with the first home agent, wherein the first home agent and the second home agent are in a same home network of the mobile node, or of the mobile access gateway acting as a proxy for the mobile node.

15. The method of claim 14, wherein the first message comprises an indication that the mobile node or mobile access gateway supports redirection.

16. The method of claim 14, wherein the determining comprises:
   determining that the first home agent meets a specified criterion; and
   selecting the mobile node or mobile access gateway from a list of devices that support redirection.

17. The method of claim 16, wherein the specified criterion comprises the first home agent exceeds a specified load limit, the home agent scheduled for down time, the home agent experiencing a fault condition, or the home agent participating in load balancing with other home agents.

18. The method of claim 14, wherein the first message is received from and the second message is sent to a mobile access gateway.

19. The method of claim 14, wherein the first message comprises a binding update and the second message comprises a binding acknowledgement.

20. The method of claim 14, wherein the second message does not comprise the address of the second home age.

* * * * *